(No Model.)
L. GATHMANN.
LENS.
No. 591,466.
Patented Oct. 12, 1897.
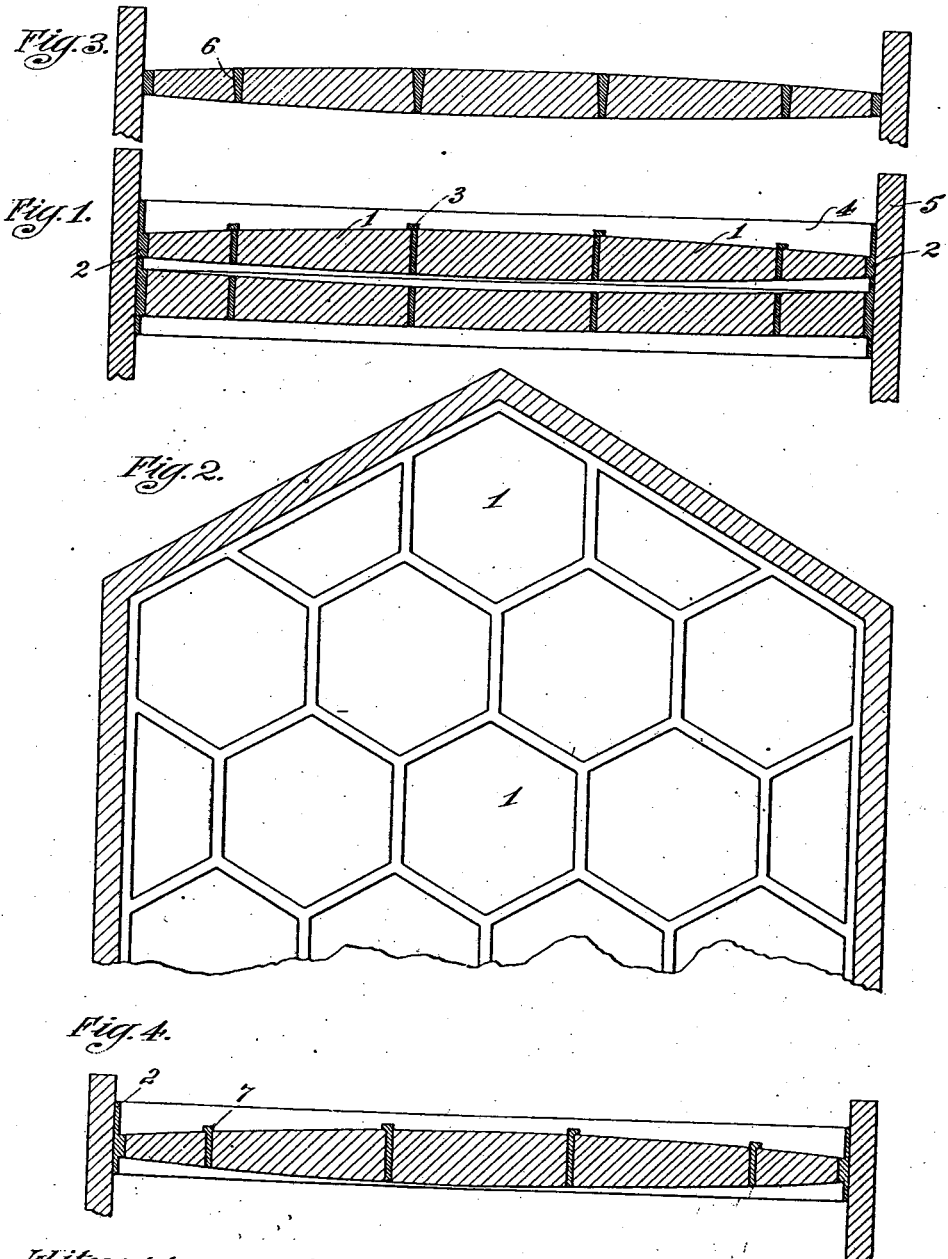
Witnesses:
Inventor
Louis Gathmann
By Harry Cobb Kennedy,
Attorney.

UNITED STATES PATENT OFFICE.

LOUIS GATHMANN, OF CHICAGO, ILLINOIS.

LENS.

SPECIFICATION forming part of Letters Patent No. 591,466, dated October 12, 1897.

Application filed June 11, 1895. Serial No. 552,451. (No model.)

*To all whom it may concern:*

Be it known that I, LOUIS GATHMANN, a citizen of the United States, residing at Chicago, in the county of Cook and State of Illinois, have invented certain new and useful Improvements in Lenses; and I do hereby declare the following to be a full, clear, and exact description of the invention, such as will enable others skilled in the art to which it appertains to make and use the same.

This invention relates to a novel construction in lenses, and more particularly to what is known as a "sectional lens"—that is to say, to a lens made up of a plurality of members or sections which are secured together side by side in the same plane and which form in conjunction with each other a complete lens.

The object of the invention is to provide in a lens of this kind certain novel features of construction whereby certain advantageous results are attained.

The invention consists of the features of construction and combination of parts hereinafter fully described and specifically claimed.

In the accompanying drawings, illustrating my invention, Figure 1 is a central transverse section of a lens constructed in accordance with my invention. Fig. 2 is a face view of the same. Figs. 3 and 4 are central transverse sections of modifications constructed in accordance with my invention.

One of the objects of my invention is to provide an achromatic lens which will retain its integrity under varying conditions of temperature, so that the focal lines of the plurality of lenses composing the achromatic lens under varying conditions of temperature will remain the same, or that their variation, if any, will be reduced to a minimum.

In accordance with the principles involved in my invention I make the lenses of the achromatic lens, as shown in Figs. 1 and 2, in sections—that is to say, the lens consists of a plurality of members or sections 1, that are situated within and held by a frame or sash 2. This frame or sash 2 can be made of either metal or glass, as found most expedient, and the members or sections 1 fitted within the openings of the frame or sash 2, and can be held therein by any suitable cement. To obviate the variation in the alinement of the focal lines, I make the sashes for the lens of the same material—that is to say, of material having the same coefficient expansion and contraction—so that under varying degrees of temperature the centers of the two lenses will always be in proper position or as near as it is possible to attain, for it will be noted that the sashes or frames expanding and contracting equally corresponding members or sections of the two lenses will always remain in the same relative position. This is an advantage in large lenses over the lenses in one piece, since in the latter the glass composing the two lenses have different coefficients of expansion and contraction. For instance, in an achromatic lens made in one piece the outer or double-convex lens is made of crown glass, while the inner or plano-concave is made of flint glass. Therefore the two lenses expand and contract unequally, and when in place in a telescope, the tube being situated at an incline—that is to say, for instance, in a lower temperature than that under which said lenses are made and corrected—the upper part of one of the lenses is contracted to a greater extent and will be thrown below the center of the other lens, and consequently the image is blurred or distorted.

In my achromatic lens, although the lenses are made of crown and flint glass, yet the frames or sashes of the lenses expanding and contracting equally will carry the members or sections of the lenses held thereby so that they will always retain the same relative position.

It will be noted, of course, that the members or sections themselves will expand and contract differently, but owing to the fact that they are in such small pieces as compared with the diameter of the complete lens the variation of the focal lines will be so infinitesimal that it will not affect the image.

It is of course understood that this invention applies specially to large lenses.

As a further and separate improvement in sectional lenses I provide a construction to obviate the reflection of the rays of light passing through the members or sections of such a lens—that is to say, the reflection from the walls of the frames against which the refracted rays would otherwise strike. To obviate this reflection—for instance, with a double-convex lens—I expose less of the outer face of the lens, so that the exposed inner face of the lens is not in alinement therewith. In this way it will be seen that although the rays are refracted, yet the exposed outer faces being smaller the rays will not strike the side walls of the frame. Of course it is essential to reduce the exposed outer faces only at such portions of the members or sections whereat the rays are refracted toward the adjacent walls of the frame, for on opposite sides the rays are refracted away from the frame, and consequently no reflection could take place.

In Figs. 1 and 2 I have shown a construction to accomplish this end which consists in placing upon the outer face of the lens a diaphragm 3, which is in a skeleton shape—that is to say, it has a number of openings corresponding with the members or sections of the lens and with its skeleton framework corresponding with the frames in which the members or sections are situated. The skeleton framework of this diaphragm, however, as shown in Figs. 1 and 2, is of sufficient width to cover the joint or the line of meeting between the members or sections and the sash or frame, as shown in said figures, and also overlaps sufficiently to obscure a portion of the outer face of the lens, as above described. This diaphragm can be made of very thin sheet metal and held in place between the sleeve 4 in the end of the tube 5 and the lens itself.

In Fig. 3 I have shown a modified construction wherein the frame or sash 2 is provided with inclined walls 6 at such points whereat it is desired to expose less of the outer face of the members or sections, and in this construction of course the corresponding side of the member or section is inclined to fit the frame.

In Fig. 4 I have shown another modification wherein the flanges or overhanging portion 7, to obscure the outer face of the members or sections of the lens, is made integral with the sash or frame 2, although at present I consider the construction shown in Figs. 1 and 2—namely, the skeleton diaphragm—the most practical embodiment of the invention.

I claim as my invention—

1. In achromatic lenses, a plurality of lenses assembled as described in the ordinary manner and each comprising a plurality of members or sections situated side by side in the same plane and forming in conjunction with each other a complete lens and secured within a frame, the frames of the lenses composing said achromatic lens consisting of material having the same coefficient of expansion and contraction, substantially as described.

2. A lens consisting of a plurality of members or sections situated side by side in the same plane and forming in conjunction with each other a telescopic lens, the faces of the members or sections being beveled at the inner sides or edges of said members or sections, substantially as described.

3. A lens consisting of a plurality of members or sections situated side by side in the same plane and forming in conjunction with each other a telescopic lens, and a diaphragm covering a portion of the outer faces of said members or sections at the edges thereof, substantially as described.

In testimony whereof I affix my signature in presence of two witnesses.

LOUIS GATHMANN.

Witnesses:
HARRY COBB KENNEDY,
RUDOLPH WM. LOTZ.